United States Patent [19]

Miyata et al.

[11] Patent Number: 4,746,223
[45] Date of Patent: May 24, 1988

[54] METER FOR INTEGRATING THE OPERATING TIME OF A STEAM TRAP

[75] Inventors: Osamu Miyata; Takayoshi Osumi; Shizuma Oishi; Hideaki Yumoto; Yoshihiko Hasegawa, all of Hyogo, Japan

[73] Assignee: TLV Co., Ltd., Kakogawa, Japan

[21] Appl. No.: 770,688

[22] Filed: Aug. 29, 1985

[30] Foreign Application Priority Data

Sep. 19, 1984 [JP] Japan ................. 59-197635

[51] Int. Cl.$^4$ ............. F16T 1/00; G01K 3/04
[52] U.S. Cl. .................... 374/103; 137/187; 368/114; 374/147
[58] Field of Search ............ 374/6, 103, 140, 181, 374/144, 102, 103, 147; 324/428; 368/114; 137/187

[56] References Cited

U.S. PATENT DOCUMENTS

| Re. 27,566 | 1/1973 | Corrsin | 368/114 |
|---|---|---|---|
| 2,054,120 | 9/1936 | De Florez | 374/107 X |
| 3,102,425 | 9/1963 | Westman et al. | 374/103 |
| 3,119,754 | 1/1964 | Blumenfeld et al. | 368/114 X |
| 3,344,343 | 9/1967 | John | 374/102 X |
| 3,444,740 | 5/1969 | Davis | 374/147 X |
| 3,602,813 | 8/1971 | Benseman | 374/102 X |
| 3,905,385 | 9/1975 | Green | 137/187 |
| 3,914,688 | 10/1975 | Lev | 324/71.1 |
| 3,916,877 | 11/1975 | Beckman | 374/181 |
| 4,006,415 | 2/1977 | Finger | 368/114 |
| 4,085,613 | 4/1978 | Richard | 374/39 |
| 4,186,606 | 2/1980 | Tarumi et al. | 374/102 X |
| 4,223,549 | 9/1980 | Kitzinger | 374/140 |
| 4,261,382 | 4/1981 | Bridges | 137/187 |
| 4,364,226 | 12/1982 | Croset et al. | 374/144 X |
| 4,456,173 | 6/1984 | Miner et al. | 73/200 |
| 4,575,258 | 3/1986 | Wall | 374/147 |

FOREIGN PATENT DOCUMENTS

| 0036108 | 2/1981 | European Pat. Off. | |
| 0160929 | 7/1979 | German Democratic Rep. | 374/103 |
| 1562582 | 3/1980 | United Kingdom . | |
| 2077928 | 6/1981 | United Kingdom . | |

Primary Examiner—Daniel M. Yasich
Attorney, Agent, or Firm—Toren, McGeady & Associates

[57] ABSTRACT

A meter for integrating the operating time of a steam trap including an integrating instrument consisting of a transparent vessel containing an electrolyte between two columns of mercury across which a DC voltage may be applied and a thermocouple including a hot junction and a cold junction connected to said instrument, wherein temperatures sensed by the hot junction causes displacement of the mercury and movement of the electrolyte in order to provide an indication of changes in temperature in a steam trap assembly.

1 Claim, 5 Drawing Sheets

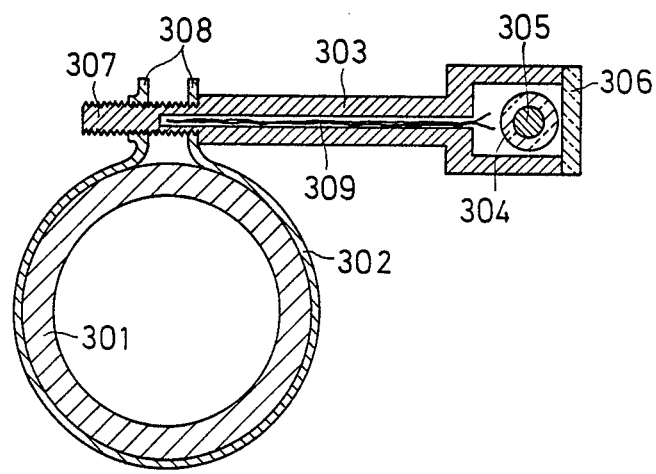

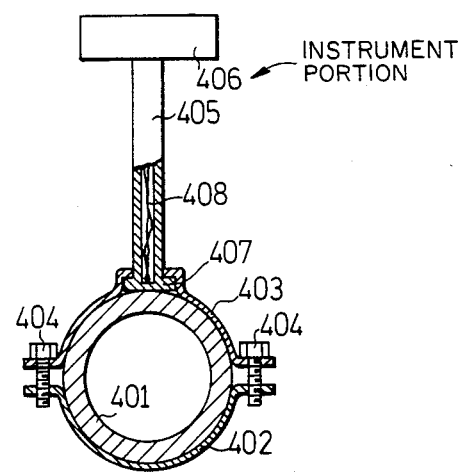

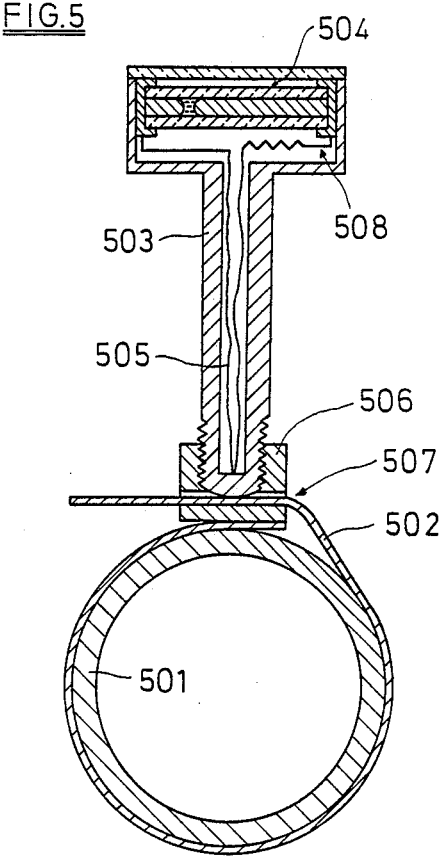

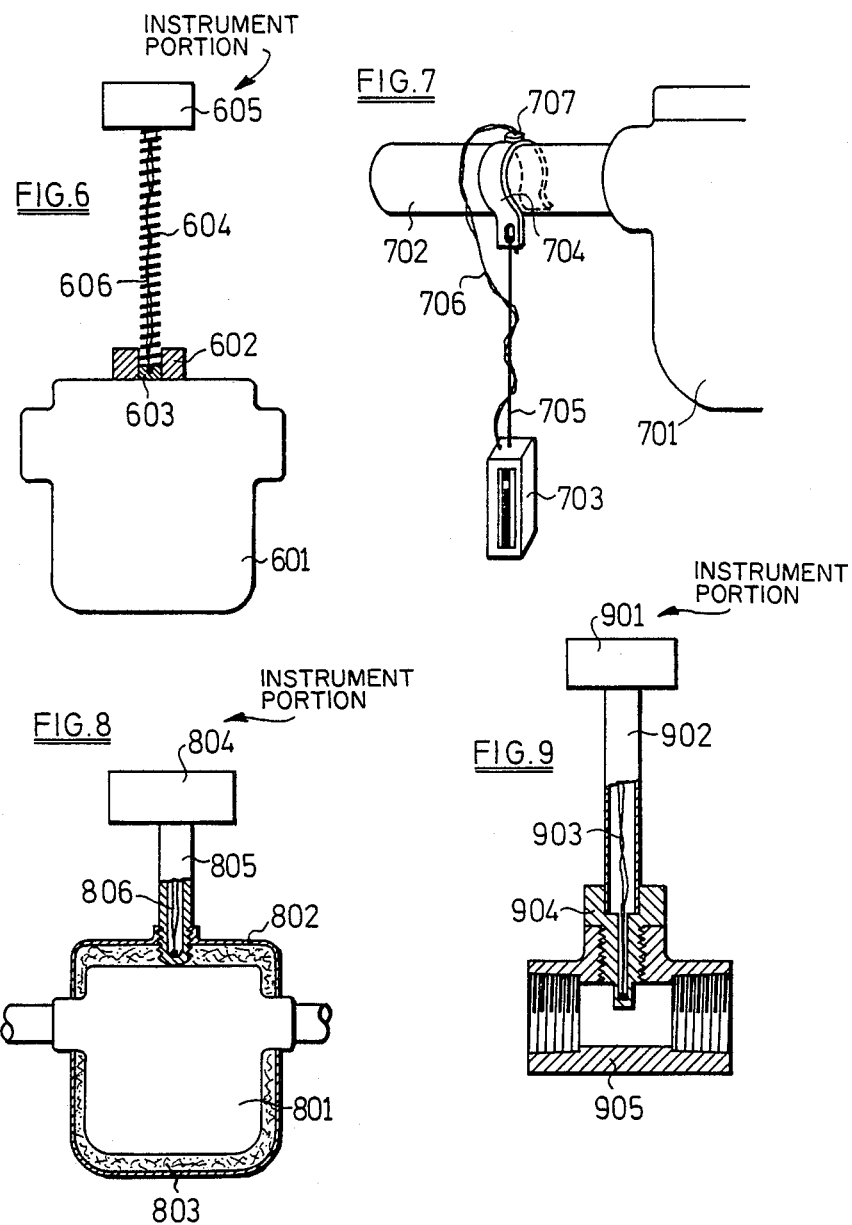

METER FOR INTEGRATING THE OPERATING TIME OF A STEAM TRAP

The present invention relates to apparatus for the maintenance of a steam trap, and more particularly, to a meter for integrating the operating time of a steam trap.

A steam trap is an automatic valve for discharging condensed water automatically from a steam transportation pipe or an apparatus in which steam is used. Its failure to function properly can result in serious accident or loss. If it fails to open, the condensed water gathering in, or filling a steam transportation pipe or an apparatus using steam gives rise to the phenomenon of water hammer, or a reduction in the operating efficiency of the apparatus resulting in the manufacture of defective products. Its failure to close causes a large amount of steam to flow out.

A great deal of care has, therefore, been taken for the maintenance of a steam trap. It has been usual to inspect it at regular intervals by using, for example, a stethoscope, vibrometer or thermometer and to keep a record of the results of inspection. A steam trap which is situated in a particularly important location is provided at its outlet with a sight glass for the visual inspection of internal steam.

It is also usual to provide a bypass between the upstream and downstream sides of a steam trap and on-off valves at the opposite ends of the bypass so that if the trap has failed, condensed water may be discharged through the bypass and the trap may be replaced with a new one quickly.

Until now, the maintenance and inspection of steam traps has required the delicate decision of a skilled person. This, however, requires extensive time, and, accordingly, it has been proposed that the labor required for the maintenance of a steam trap be reduced by estimating its life and thereby establishing a schedule for its inspection or replacement, or by adopting a product of higher reliability.

The life of a steam trap is, however, not easy to estimate, since it not only differs from one type trap to another, but it also depends on the conditions under which it is used (e.g., steam pressure, water quality and the operating conditions of the apparatus in which steam is used). It is necessary to measure the actual operating time of each individual steam trap at the site of an installation. This is a job which requires a lot of labor. Thus, it is essential to develop a meter which is easy to use and inexpensive to make, and it must be a meter which can integrate the actual operating time of a steam trap.

As a steam trap in use contains steam and hot condensed water, it is possible to determine its operating conditions if its temperature or the temperature of the pipeline upstream or downstream thereof is detected.

It is, therefore, an object of this invention to provide a simple meter which can integrate the operating time of a steam trap by detecting its temperature or the temperature of the pipeline upstream or downstream thereof and enable a determination of the length of time during which the steam trap or the pipeline stays at a high temperature.

SUMMARY OF THE INVENTION

Briefly, the present invention may be described as a meter comprising:

(a) an instrument for integrating the time of power application comprising a transparent vessel containing an electrolyte between two columns of mercury across which a DC voltage is applied for the electrolytic deposition of mercury from one of the columns to the other, the distance of the resulting displacement of the electrolyte indicating the time of power application, and a thermocouple connected to the instrument;

(b) the instrument and the standard junction of the thermocouple being disposed in a casing which is thermally insulated from the temperature measuring junction of the thermocouple;

(c) the meter being mounted on a steam trap or a pipeline upstream or downstream thereof in such a way that the temperature measuring junction of the thermocouple may be located within the steam trap or the pipeline, or on or in the vicinity of the surface of the steam trap or the pipeline.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE DRAWINGS

In the drawings:

FIGS. 3-9 show various further embodiments of the invention with FIGS. 3-6, 8 and 9 being sectional views and FIG. 7 being a perspective view.

DETAILED DESCRIPTION OF THE PREFERRED EMBODIMENTS

Figure 1:
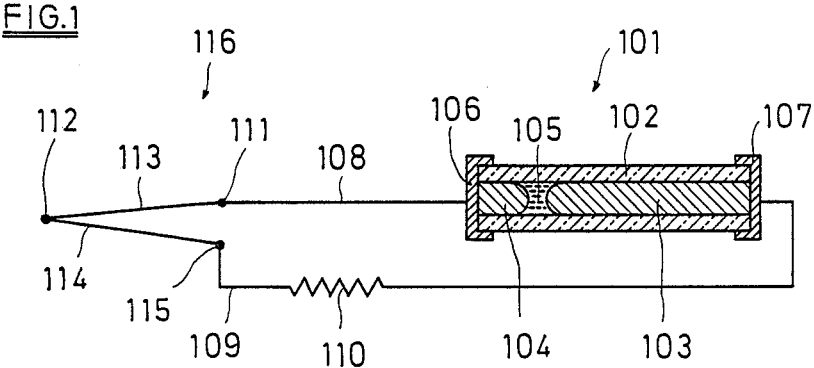
FIG. 1 is a schematic diagram partially in section showing the basic elements of the invention.

Referring now to the drawings and particularly to FIG. 1, there is shown the basic mechanism of the invention which consists of an electrolytic instrument 101 for integrating the time of power application and which comprises a transparent cylindrical glass vessel 102 containing an electrolyte 105 disposed between two columns 103 and 104 of mercury. The opposite ends of the vessel 102 are tightly closed by electrically conductive terminals 106 and 107.

A thermocouple 116 comprises two wires 113 and 114 of different conductors joined at one end 112 which defines a temperature measuring junction (hot junction). The other ends of the wires 113 and 114 are connected by compensating lead wires 108 and 109 to the terminals 106 and 107, respectively, of the instrument 101. The junctions 111 and 115 between the thermocouple wires and the compensating lead wires define standard junctions (cold junctions). The electric circuit thus formed includes a resistor 110 to supply an appropriately rated electric current to the instrument 101.

The hot junction 112 is located in a high temperature region, e.g., on a steam trap, as will hereinafter be described, while the cold junctions 111 and 115 are kept at an ambient temperature. As the instrument 101 need be used in a relatively low temperature range, it and the cold junctions 111 and 115 are located in an area which is thermally insulated from the hot junction 112.

Due to the Seebeck effect, the thermocouple 116 generates a thermoelectric electromotive force which depends on the difference in temperature between the hot junction 112 and the cold junctions 111 and 115, thereby causing the application of a DC voltage across the terminals 106 and 107 on the instrument 101. If the terminal 106 is positive and the terminal 107 is negative, mercury is electrolytically deposited from the column 104 near the terminal 106 to the column 103 near the terminal 107 to the extent proportional to the voltage applied. As a result, the electrolyte 105 is displaced toward the terminal 107 (to the right in FIG. 1). This displacement is visible through the wall of the transparent vessel 102.

Figure 2:
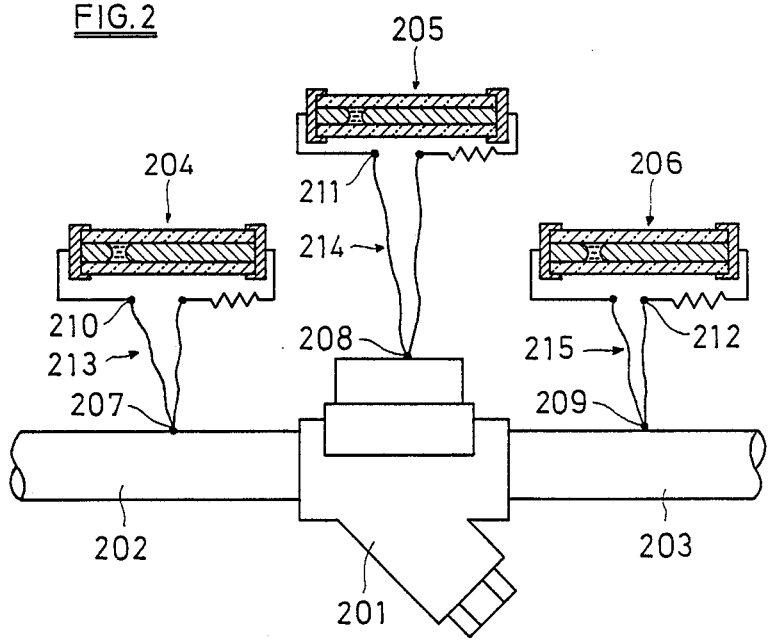
FIG. 2 is a schematic diagram showing a steam trap system embodying the present invention.

An example of an installation embodying the present invention is shown in FIG. 2.

The condensed water formed in a steam transportation pipeline or an apparatus employing steam (not shown) is collected into a steam trap 201 through an upstream pipe 202 and discharged into a drain (not shown) through a downstream pipe 203. The steam trap 201 is a typical steam trap of the disk type.

Meters 204, 205 or 206 according to this invention for integrating the operating time of the steam trap are installed so that hot junctions 207, 208 or 209 of thermocouples 213, 214 or 215 may be located within the upstream pipe 202, steam trap 201 or downstream pipe 203, respectively or on or in the vicinity of the surface thereof. Each cold junction 210, 211 or 212 is located so that it may be kept at an ambient temperature.

If the steam trap 201 is out of operation or fails to open, it and the upstream pipe 202 stay at a low temperature, while the rest stays at a high temperature. Therefore, the meter 204 on the upstream pipe 202 or the meter 205 on the steam trap 201 integrates the actual operating time of the steam trap 201 almost accurately.

The operating time of the steam trap is integrated even if it fails to close and causes steam to leak. This is not necessarily undesirable, as it enables the estimation of the life of the steam trap which is shortened by any such trouble. In any such event, the abnormal increase in the displacement of the electrolyte indicates the presence of any such fault in the steam trap.

The temperature of the downstream pipe 203 is a good index of the operation of the steam trap 201. As the disk type steam trap opens and closes intermittently, the integrating meter 206 on the downstream pipe 203 detects the intervals of trap operation and enables a more accurate estimation of its life. If a high back pressure causes steam and condensed water to gather in the downstream pipe 203, however, a change in temperature is so slow that the meter fails to integrate the operating time of the steam trap 201 accurately.

In FIG. 3, there is shown a further embodiment of the invention comprising a meter connected to a pipe 301 upstream or downstream of a steam trap by a metal band 302. A casing 303 is generally in the shape of a rod and has at one end (right end in FIG. 3) an elongate concavity accommodating an instrument for integrating the time of power application, which comprises a glass tube 304 containing an electrolyte between two columns 305 of mercury, the cold junction of a thermocouple and the components of an electric circuit. The concavity is convered by a glass plate 306. This portion will be referred to as the instrument portion in all of the other examples, too.

The casing 303 is externally threaded at the other end thereof. The band 302 has a pair of ends 308 brought close to each other and is thereby tightened about the pipe 301.

The casing 303 has an internal bore in which thermocouple wires 309 are located. The hot junction of the thermocouple is located in as close a proximity to the pipe 301 as possible, and the casing 303 is sufficiently thin or long, or formed from a material of low thermal conductivity, so that the instrument portion may be kept close to an ambient temperature. The band 302 has an inside diameter which is slightly larger than the outside diameter of the pipe 301. No separate part is required for tightening the band 302, as the threaded end 307 of the casing 303 serves as a tightening screw.

Another embodiment of the invention shown in FIG. 4 comprises a meter including a casing 405 secured to a pipe 401 upstream or downstream of a steam trap by two semicircular members 402 and 403. The casing 405 is generally in the shape of a rod and has at its lower end a flange 407 which is held between the pipe 401 and the semicircular member 403. The semicircular members 402 and 403 are tightened together about the pipe 401 by two bolts 404.

The casing 405 defines an instrument portion 406 at its upper end and has an axial bore in which thermocouple wires 408 are located.

If the semicircular members 402 and 403 have a sufficiently large thickness, they produce a greater tightening force than the band 302 in FIG. 3.

A further embodiment is shown in FIG. 5, wherein another type of band 502 is employed for securing an integrating meter embodying this invention to a pipe 501 upstream or downstream of a steam trap. The band 502 has one end welded to the bottom of a tightening member 506 and the other end thereof extends through a slit 507 in the tightening member 506 and is held by the lower end of the casing 503 threadedly engaged in the tightening member 506.

The casing 503 defines an instrument portion 504 at its upper end and has an axial bore in which thermocouple wires 505 of thermocouple 508 are located. Of course, it should be understood that the instrument portion 504 essentially constitutes an electrolytic instrument essentially identical with the instrument 101 shown in FIG. 1 and that the thermocouple wires 505 represent wires similar to wires 113, 114 which make up the thermocouple 116.

The band 502 is easy to handle, since it has a very large allowance relative to the outside diameter of the pipe 501 and is wound about the pipe 501 manually.

In a further embodiment shown in FIG. 6, a coiled spring 604 is connected between the instrument portion 605 of an integrating member embodying the invention and a member 603 for securing the hot junction of thermocouple wires 606. A magnet 602 is secured to the securing member 603 for holding it magnetically on the top of a float type steam trap 601.

The use of the magnet facilitates the installation of the meter on any object if it is formed from a magnetic material. The coiled spring 604 is a good thermal insulator between the hot junction of the thermocouple wires 606 and the instrument portion 605.

In a further embodiment shown in FIG. 7, the instrument portion 703 of an integrating meter embodying this invention is suspended by a thin wire 705 from a hook 704 fitted about a pipe 702 upstream or downstream of a steam trap 701. The hot junction 707 of thermocouple wires 706 is secured to the top of the hook 704.

The suspension of the instrument by the wire 705 facilitates its installation and is also effective for the purpose of thermal insulation.

Steam traps, particularly of the mechanical type, have recently come to be covered by heat insulating covers. FIG. 8 shows an arrangement which is suitable for such steam traps.

A heat insulating cover for a float type steam trap 801 comprises a heat insulating material 803 and an outer facing 802 covering it. A meter for integrating the operating time of the steam trap includes a generally rod-shaped casing 805 defining an instrument portion 804 at its upper end. The casing 805 has an externally threaded lower end threadedly connected into the outer facing of the heat insulating cover and contacts the surface of the steam trap 801. The casing 805 has an axial bore in which thermocouple wires 806 are located.

The heat insulating cover is used for mounting the meter and eliminates the necessity for the provision of any separate mounting member. Moreover, the cover ensures that the instrument portion be kept close to an ambient temperature.

In FIG. 9, there is shown an integrating meter embodying this invention which includes a casing 902 threadedly connected in a gas-tight fashion with a T-shaped joint 905 connected to a pipe upstream or downstream of a steam trap. The casing 902 is generally in the shape of a rod and defines an instrument portion 901 at its upper end. The casing 902 has an axial bore in which thermocouple wires 903 are located.

The casing 902 is provided at its lower end with a plug 904 which is threadedly connected with the T-shaped joint 905. The plug 904 has a lower end projecting into a fluid passage in the joint 905 and the hot junction of the thermocouple wires 903 is located in the projecting end of the plug 904.

This arrangement enables the thermocouple to detect the temperature of the fluid in the piping directly with a high degree of sensitivity.

Thus, from the foregoing, it will be seen that with the meter of the present invention, the temperature measuring junction (hot junction) of the thermocouple is located within the steam trap or the pipeline upstream or downstream thereof, or on or in the vicinity of the surface of the steam trap or the pipeline and reaches the temperature of that location. The standard junction (cold junction) is thermally insulated from the hot junction and kept at an ambient temperature. Therefore, an electromotive force is generated as a result of the Seebeck effect and causes a DC voltage to be applied across the two columns of mercury in the integrating instrument.

This flow of electric current causes the electrolytic deposition of mercury from one column charged with positive electricity to the other charged with negative electricity through the electrolyte, and hence, a change in position of the electrolyte from the negatively charged column to the positively charged one. This change in position can be seen through the wall of the transparent vessel.

The distance of such displacement of the electrolyte is proportional to the amount of the electric current which has been caused to flow. The electromotive force of the thermocouple increases substantially in proportion to the difference in temperature between its hot and cold junctions. The higher the temperature of the steam trap or the pipeline, the greater electromotive force is generated, as the cold junction is kept at the ambient temperature. Accordingly, the change in position of the electrolyte occurs when the steam trap is is operation, and does not when it is out of operation. As each steam trap is always operated at a substantially equal temperature, or a temperature varying in a substantially equal pattern, the distance of displacement of the electrolyte is proportional to the operating time of the steam trap.

This invention produces a number of special advantages. The combination of the electrolytic instrument and the thermocouple is inexpensive to manufacture, since it does not require any switch circuit for ascertaining whether the steam trap is in operation or not.

The meter of the invention is easy to handle, since it employs the heat of steam as a source of electrical energy and does not require any separate source of power supply.

As the pressure of the steam rises, the steam trap or the pipeline has a higher temperature and the thermocouple generates a greater electromotive force resulting in a faster displacement of the electrolyte. The higher the pressure of steam, the shorter life the steam trap has. Therefore, it is possible to estimate the approximate life of the steam trap from the distance of displacement of the electrolyte without taking the pressure of steam into account.

The electrolyte does not move if the steam trap collects condensed water and has a low temperature because of its failure to open, but moves fast if it causes steam to leak and has a high temperature because of its failure to close. Therefore, if the distance of its displacement is measured at regular intervals, it is possible to discover any fault of the steam trap and estimate its approximate life from the tendency which the electrolyte shows in the distance of displacement.

While specific embodiments of the invention have been shown and described in detail to illustrate the application of the inventive principles, it will be understood that the invention may be embodied otherwise without departing from such principles.

What is claimed is:

1. A meter for integrating the operating time of a steam trap comprising: an instrument for integrating the time of power application, said instrument consisting of a transparent vessel containing an electrolyte between two columns of mercury across which a DC voltage is applied for the electrolytic deposition of mercury from one of said columns to the other, the distance of the resulting displacement of said electrolyte indicating the time of power application; and a thermocouple including a hot junction and at least one cold junction connected to said instrument; said instrument and the cold junction of said thermocouple being disposed in a casing which is thermally insulated from the hot junction of said thermocouple; said meter being mounted relative to said steam trap in such a way that said hot junction is located to sense operational temperatures of said steam trap; said meter further comprising a casing having a portion defining an elongate internal cavity with said instrument being located at one end thereof and with said hot junction being located at the opposite end thereof and with thermocouple wires extending within said elongate internal cavity connecting together said instrument with said hot junction; said casing being attached to a pipe within which the temperature is to be sensed with said hot junction in close proximity to said pipe, with a band being provided encircling said pipe and connecting said casing thereto, and a tightening member being threadedly engaged with said casing and having one end of said band fixed thereto and the opposite end of said band adjustably attached thereto.

* * * * *